(12) United States Patent
Müller

(10) Patent No.: US 6,388,266 B1
(45) Date of Patent: May 14, 2002

(54) DEVICE FOR READ-OUT AND ERASING INFORMATION FROM STORAGE SHEETS

(75) Inventor: Jürgen Müller, München (DE)

(73) Assignee: AGFA-Gevaert AG, Leverkusen (DE)

( * ) Notice: Subject to any disclaimer, the term of this patent is extended or adjusted under 35 U.S.C. 154(b) by 0 days.

(21) Appl. No.: 09/443,899

(22) Filed: Nov. 19, 1999

(30) Foreign Application Priority Data

Dec. 24, 1998 (DE) .......................................... 198 60 247

(51) Int. Cl.[7] .............................................. G01N 23/04
(52) U.S. Cl. ...................................... 250/588; 250/589
(58) Field of Search ................................. 250/588, 589

(56) References Cited

U.S. PATENT DOCUMENTS 5,665,976 A    9/1997  Arakawa .................... 250/588
5,736,746 A  * 4/1998  Furutoh ...................... 250/589
5,818,065 A  * 10/1998 Exelmans .................... 250/588

* cited by examiner

Primary Examiner—Scott J. Sugarman
Assistant Examiner—Mohammed Hasan
(74) Attorney, Agent, or Firm—Darby & Darby

(57) ABSTRACT

A device for read-out and erasing information from storage sheets which are located in a cassette. The device includes a cassette holder, means for opening the cassette, a scanner for read-out the stored information, an erasing device for erasing the stored information and a transport device which transports the storage sheet past the scanner and the erasing device. According to the invention, the erasing device is provided between the cassette holder and the scanner.

10 Claims, 1 Drawing Sheet

DEVICE FOR READ-OUT AND ERASING INFORMATION FROM STORAGE SHEETS

BACKGROUND OF THE INVENTION

1. Field of the Invention

The invention relates to a device for read-out and erasing information from storage sheets which are conveyed to the device in a cassette, with a cassette holder, means for opening the cassette, a scanner for reading the stored information, an erasing device for erasing the stored information and a transport device which transports the storage sheet past the scanner and the erasing device.

2. Description of the Related Art

U.S. Pat. No. 5,665,976 discloses a device which can be used to read-out and erase stimulable phosphor sheets. First, the sheets are transported past a scanner and thereafter past an erasing station. In the erasing station, the sheet is irradiated with light of a predetermined wavelength which does not interfere with the scanning process. After the sheet has passed the erasing station, the transport direction is reversed, and the sheet is moved past the erasing station for a second time. Since the second erasing process takes place after the scanning operation, light of a different wavelength can be used.

To scan a sheet which has been removed from the cassette, the sheet initially has to be either centered or at least moved to a pre-defined position. This operation requires physical space. Typically, the sheet is removed from the cassette, then oriented and subsequently conveyed to the scanner, meaning that the scanner and the cassette are separated by approximately the length of one sheet. A sheet can be scanned accurately only after having been precisely oriented.

A scanner for scanning storage sheets typically has a small scan slit opening. Respective transport roller pairs are arranged in close proximity before and after the scan slit opening, respectively. This arrangement ensures a uniform speed of the sheets past the scan slit opening. In the device disclosed in U.S. Pat. No. 5,665,976, the sheet moves from the roller pair located after the scanner to the erasing device. As clearly indicated, an additional roller pair which grips the sheet is located after the erasing device to pull the rearward end of the sheet past the erasing device. Consequently, the arrangement illustrated in U.S. Pat. No. 5,665,976 requires at least three roller pairs making contact with the sheet after the sheet is removed from the cassette.

In conventional devices, the presence of at least three transport roller pairs and the required separation between the cassette and the scanner necessitate long transport paths for the storage sheets. In order to nevertheless make the housing compact, the transport paths are typically folded, necessitating small bending radii.

SUMMARY OF THE INVENTION

It is an object of the invention to provide a device for read-out and erasing information from storage sheets which ensures a gentle treatment of the storage sheets. Small radii on the transport paths and a large number of transport roller pairs should also be avoided.

The object is solved by an arrangement providing an erasing device between a cassette holder and a scanner. By locating the erasing device between the scanner and the cassette holder, the device requires only two transport roller pairs. Accordingly, abrasion and wear of the storage sheets can be reduced significantly. Moreover, the section of the transport path provided for erasing the storage sheets can also be used for aligning the storage sheets. This arrangement provides an extremely compact construction and a very short transport path.

The respective transport roller pairs are arranged before and after the scan slit opening, respectively. For the read-out process, the storage sheet is removed from the cassette by a transfer device, moves past the erasing device which is not activated, and is then transported by the transport roller pairs past the scanner, until the storage sheet is held only by the transport roller pair located after the scan slit opening.

For erasing, the sheet is transported in the opposite direction. The transport speed during the erasing process can be greater than during the scanning operation.

The cassette holder, the erasing device and the scanner are vertically stacked one on top of the other. The cassette holder is oriented in such a way that the storage sheet can be removed downwardly from the cassette and conveyed with its forward marginal region directly to the transport roller pair arranged above the scan slit opening. The storage sheet can thus be guided over the entire transport path from the cassette past the erasing device and the scanner essentially without changing direction.

With this advantageous arrangement, the scanning process can already begin when a portion of the storage sheet is still located inside the cassette. Likewise, the erasing process during transport of the sheet in the reverse direction ends after a major portion of the storage sheet is already positioned inside the cassette.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

Additional details and advantages of the invention are described in the dependent claims, taken in conjunction with the description of an embodiment which is described in detail with reference to the drawings.

DETAILED DESCRIPTION OF THE PRESENTLY PREFERRED EMBODIMENTS

Figure 1:
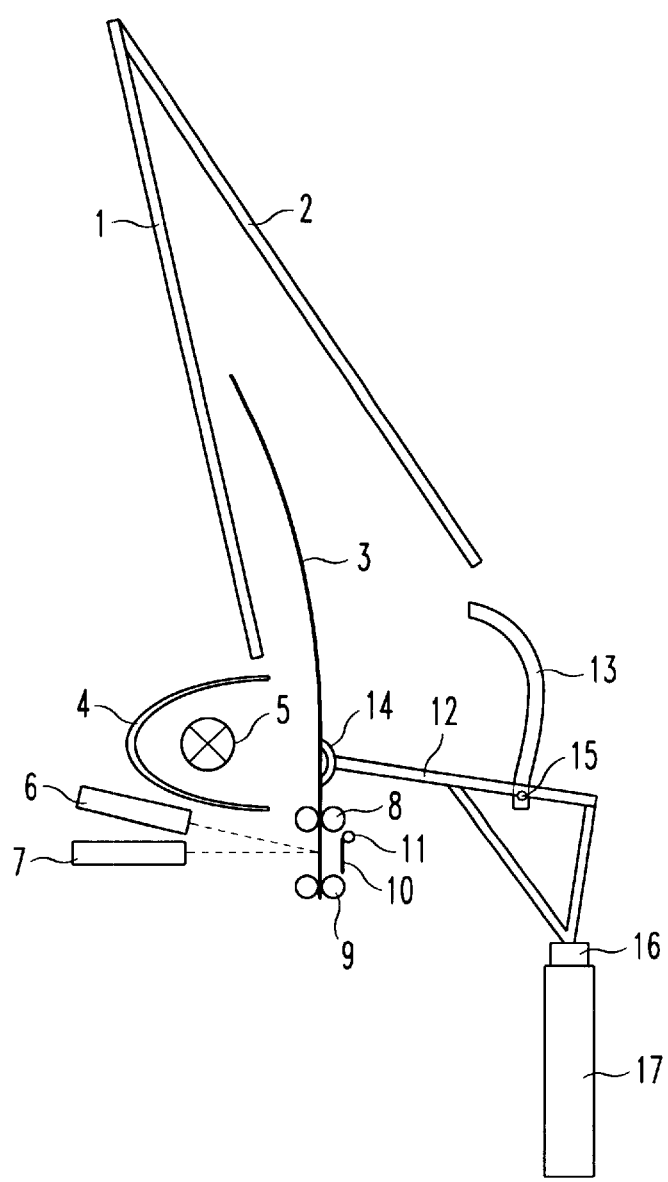
FIG. 1 shows a schematic diagram of a device according to the invention.
Figure 2:
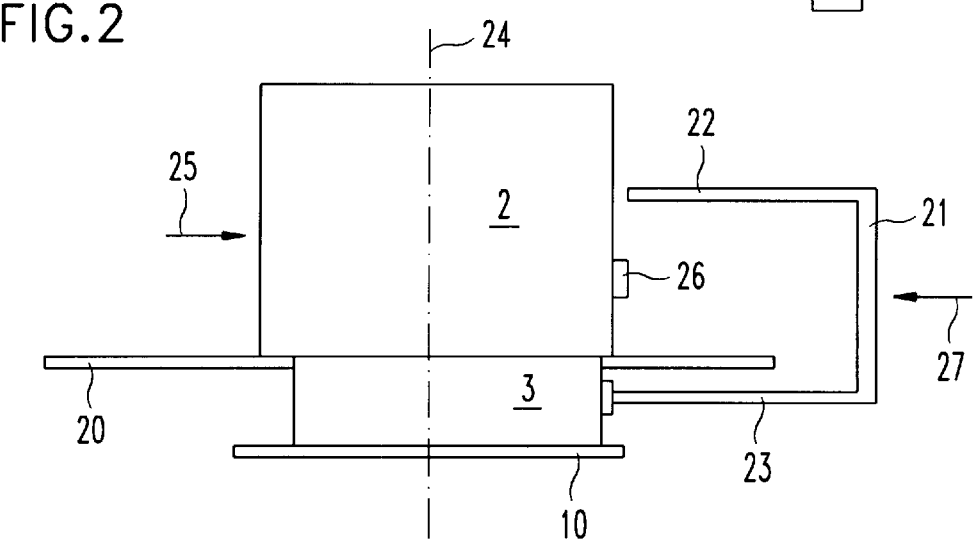
FIG. 2 shows a device for centering and orienting the sheet in the scanner.

A cassette for housing a storage sheet 3 includes a bottom 1 and a cover 2 hingedly attached to the bottom 1. The cassette holder 20 is only schematically indicated in FIG. 2 for sake of clarity. The cassette holder 20 includes a retaining and transport device for the cassette 1, 2 which moves the cassette to the stop 26 in the direction of the arrow 25.

An erasing device with an erasing light source 5 and a reflector 4 is located below the cassette holder. Two transport roller pairs 8 and 9 are arranged below the erasing device subsequent to the erasing device, as viewed in the transport direction of the storage sheet. Each of the transport roller pairs 8 and 9 can be moved to an open position and a closed position, respectively. A support rail 10 for supporting the storage sheet can be rotated about a pivot point 11 and inserted between the transport roller pairs 8 and 9.

The scanner 6, 7 reads the stored information between the transport roller pairs 8 and 9. A laser radiation source 6 excites the storage sheet point-by-point to emit radiation. The reading device 7 recognizes the radiating points and transmits the measured radiation values to an image processing device (not shown).

A vacuum suction device 14 which is attached to a lever system 12 is provided for removing the storage sheet 3 from the cassette 1, 2 and transferring the storage sheet 3 to the gap of the first transport roller pair 8. The lever system can be moved in a connecting link 13 via a flange 15. The lever system is moved by a pneumatic cylinder 17 having a piston 16 which is connected to the lever system.

The device for centering the cassette 1, 2 and the storage sheet 3 (FIG. 2) includes a slider 21 having two arms 22 and 23 of different length. The length of the two arms is selected so that the storage sheet is centered relative to the cassette when the arm 22 contacts the cassette 1, 2 and the arm 23 contacts the storage sheet 3. This causes the vertical center lines of the storage sheet and of the cassette to overlap.

When a cassette with a storage sheet to be read-out is conveyed to the device, the cassette is transported in the direction of the arrow 25 until the cassette contacts the stop 26. The location of the stop is selected so that the vertical center line of the cassette moves past the center line 24 of the scanner. Even if the storage sheet 3 has lateral play inside the cassette, the vertical center line of the storage sheet 3 is still reliably positioned to the right to of the center line 24 of the scanner (see FIG. 2). The cassette is then opened by a conventional mechanism (not shown). For example, the cassette may be pushed downwardly on two opening pins which then actuate the closure mechanism of the cassette.

Thereafter, the piston 16 of the pneumatic cylinder 17 is extended, so that the flange 15 moves upwardly in the connecting link 13. When the piston 16 reaches its upper position, the vacuum suction device 14 disposed on the lever system 12 is pressed against the storage sheet 3, with a vacuum established by a suitable device. The vacuum suction device 14 is then returned to its lower end position by the pneumatic drive 16, 17. The transport roller pair 8 is moved into its open position and the rail 10 is pivoted against the storage sheet 3, so that the forward marginal edge of the storage sheet 3 now rests on the rail 10. The storage sheet is then released by the vacuum suction device 14 so as to move freely from side to side on the rail 10.

The slider 21 is moved in direction of the arrow 27 and the cassette as well as the storage sheet are moved until the vertical center lines of the storage sheet and the cassette overlap with the center line 24 of the scanner. The sheet is thereby centered with respect to the scanner. The transport roller pair 8 is then closed and the rail 10 is rotated outwardly. The scanning process starts, with the transport roller pair 8 transporting the storage sheet to the open gap of the transport roller pair 9. At the same time, the transport roller pair 9 moves into its closed position, and the transport roller pair 8 slowly opens. As a result, the storage sheet 3 its essentially transported by only one of the transport roller pairs at all times. The transition between the engagement of the transport roller pair 8 and the engagement of the transport roller pair 9 is smooth and continuous.

Accordingly, the entire storage sheet 3 is transported past the scanner without the need for an additional transport roller pair. At the end of the scan, the transport roller pair 9 stops and grips the rearward edge of the storage sheet 3. The erasing light source 5 is then switched on and the transport roller pair 9 transports the storage sheet in the opposite direction at an increased speed to return the storage sheet to the cassette. When the storage sheet is returned while the erasing device is activated, as described above, the transport function is again transferred from one transport roller pair to the other transport roller pair. When the transport roller pair 8 moves into the closed position, the transport roller pair 9 slowly opens.

The transport roller pair 8 is stopped when only the forward edge of the storage sheet is located between the transport roller pair 8; the rail 10 is again rotated inwardly and the transport rollers are moved to the open position.

Sensors (not shown) can be used to determine if the sheet 3 is still in a position which is centered with respect to the cassette. Alternatively, the slider 21 may be actuated for a second time in the direction of the arrow 26, thereby moving both the cassette and the sheet by a small distance. In this way, the sheet may again be properly positioned with respect to the cassette.

The vacuum suction device 14 is activated again to remove the storage sheet 3 from the open gap of the transport roller pair 8 and to place the storage sheet 3 inside the cassette 1, 2. The cover 2 is closed and the cassette is transported to an output device in the opposite direction of the arrow 25.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. A device for reading information from a storage sheet, wherein said storage sheet is provided in a cassette, said device comprising a cassette holder;

means for opening the cassette;

a scanner for reading stored information on the storage sheet;

an erasing device for erasing the stored information, the cassette holder, erasing device and scanner being positioned and aligned in one direction with the erasing device positioned between the cassette holder and scanner;

a transport device for transporting the storage sheet past the scanner and the erasing device in substantially said one direction only whereby the storage sheet is scanned and erased while moving in said one direction.

2. The device according to claim 1, wherein the transport device comprises a first transport roller pair and a second transport roller pair which define a scan slit opening, the first transport roller pair being positioned on one side of the opening and the second transport roller pair being positioned on the other side of the opening, with the spacing between said transport roller pairs being such that when scanning is complete, the sheet is held by the second transport roller pair so that it can be returned to the first transport roller pair by reversing the rotation of the second transport roller pair, so that the storage sheet can be erased and returned to the cassette by reverse rotation of the first transport roller pair.

3. The device according to claim 2, further comprising a transfer device for removing the storage sheet from the cassette and transferring the storage sheet to the transport roller pair arranged before the scan slit opening.

4. The device according to claim 3, wherein the transport roller pairs can be driven in opposite directions at different speeds.

5. The device according to claim 4, wherein the transport device can be driven in a first direction for read-out information and in the opposite direction for erasing information.

6. The device according to claim 1, wherein the cassette holder is oriented in such a way that the storage sheet can be removed in a vertical direction.

7. The device according to claim 2, wherein said transport device includes only two transport roller pairs.

8. The device according to claim 1, wherein said cassette holder, erasing device and scanner are vertically aligned one on top of the other, and wherein the storage sheet is moved substantially only in a vertical direction.

9. The device according to claim 8, wherein said cassette holder, erasing device and scanner are positioned in close proximity such that scanning of a storage sheet can start before the storage sheet is out of its cassette and erasing of a portion of the storage sheet takes place while at least the upper portion of the storage sheet is within the cassette.

10. The device according to claim 9, wherein the transport device comprises a first transport roller pair and a second transport roller pair which define a scan slit opening, the first transport roller pair being positioned above the opening and the second transport roller pair being positioned below the opening, with the spacing between said transport roller pairs being such that when scanning is complete, the sheet is held by the second transport roller pair so that it can be returned to the upper transport roller pair by reversing the rotation of the second transport roller pair, so that the storage sheet can be erased and returned to the cassette by reverse rotation of the first transport roller pair.

* * * * *